United States Patent
West et al.

(10) Patent No.: US 6,679,612 B1
(45) Date of Patent: Jan. 20, 2004

(54) ADJUSTABLE MIRROR AND SOUND SYSTEM FOR A REAR SEAT OF A VEHICLE

(76) Inventors: Robin J. West, 2328 Palomira Ct., Chula Vista, CA (US) 91915; Beatrice W. Yehudah, 2328 Palomira Ct., Chula Vista, CA (US) 91915

( * ) Notice: Subject to any disclaimer, the term of this patent is extended or adjusted under 35 U.S.C. 154(b) by 0 days.

(21) Appl. No.: 10/184,388

(22) Filed: Jun. 28, 2002

(51) Int. Cl.[7] .............................................. G02B 7/182
(52) U.S. Cl. ....................................... 359/871; 359/877
(58) Field of Search ................................. 359/871, 872, 359/877, 879, 880, 881, 857; 472/57, 63, 64; 362/488

(56) References Cited

U.S. PATENT DOCUMENTS

| | | | |
|---|---|---|---|
| 3,950,701 A | * | 4/1976 | Matuoka et al. ............. 455/345 |
| 4,072,314 A | * | 2/1978 | Rosen et al. ................. 273/161 |
| 4,359,266 A | | 11/1982 | Rohlf et al. |
| 4,712,892 A | | 12/1987 | Masucci |
| 4,733,956 A | | 3/1988 | Erickson |
| 4,902,118 A | | 2/1990 | Harris |
| 4,909,618 A | * | 3/1990 | Gardner ....................... 359/862 |
| D332,076 S | | 12/1992 | El-Faham |
| 5,285,321 A | | 2/1994 | Nolan-Brown |
| 6,039,455 A | * | 3/2000 | Sorenson ..................... 362/142 |
| 6,554,437 B2 | * | 4/2003 | Von Glasow ............... 359/872 |
| 2003/0002180 A1 | * | 1/2003 | Nielsen et al. .............. 359/877 |

* cited by examiner

Primary Examiner—Euncha Cherry

(57) ABSTRACT

An adjustable mirror and sound system for viewing the rear seat of a vehicle for allowing the driver of the vehicle to keep watch on a child seated in the rear seat behind the driver. The adjustable mirror and sound system for viewing the rear seat of a vehicle includes a clamping assembly being adapted to securely clamp to a child's car seat or inside of a passenger compartment of a vehicle; and also includes a mirror and sound support assembly including an elongate support member having a first end and a second end which is securely attached to the clamping assembly; and further includes a mirror and sound assembly being adjustably mounted to the mirror and sound support assembly; and also includes a mirror and sound system control assembly for adjusting positioning, volume, and lighting of the mirror and sound assembly.

11 Claims, 2 Drawing Sheets of the vehicle to keep watch on a child seated in the rear seat
ADJUSTABLE MIRROR AND SOUND SYSTEM FOR A REAR SEAT OF A VEHICLE

BACKGROUND OF THE INVENTION

1. Field of the Invention

The present invention relates to a mirror and sound system for a rear seat of a vehicle and more particularly pertains to a new adjustable mirror and sound system for viewing the rear seat of a vehicle for allowing the driver of the vehicle to keep watch on a child seated in the rear seat behind the driver.

2. Description of the Prior Art

The use of a mirror and sound system for a rear seat of a vehicle is known in the prior art. More specifically, a mirror and sound system for a rear seat of a vehicle heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,733,956; U.S. Pat. No. 5,285,321; U.S. Pat. No. 4,902,118; U.S. Pat. No. 4,712.892; U.S. Pat. No. 4,359,266; and U.S. Pat. No. Des. 332,076.

While these devices fulfill their respective, particular objectives and requirements, the aforementioned patents do not disclose a new adjustable mirror and sound system for viewing the rear seat of a vehicle. The inventive device includes a clamping assembly being adapted to securely clamp to a child's seat in a rear seat of a vehicle; and also includes a mirror and sound support assembly including an elongate support member having a first end and a second end which is securely attached to the clamping assembly; and further includes a mirror and sound assembly being adjustably mounted to the mirror and sound support assembly; and also includes a mirror and sound system control assembly for adjusting positioning, volume, and lighting of the mirror and sound assembly.

In these respects, the adjustable mirror and sound system for viewing the rear seat of a vehicle according to the present invention substantially departs from the conventional concepts and designs of the prior art, and in so doing provides an apparatus primarily developed for the purpose of allowing the driver of the vehicle to keep watch on a child seated in the rear seat behind the driver.

SUMMARY OF THE INVENTION

In view of the foregoing disadvantages inherent in the known types of mirror and sound system for a rear seat of a vehicle now present in the prior art, the present invention provides a new adjustable mirror and sound system for viewing the rear seat of a vehicle construction wherein the same can be utilized for allowing the driver of the vehicle to keep watch on a child seated in the rear scat behind the driver.

The general purpose of the present invention, which will be described subsequently in greater detail, is to provide a new adjustable mirror and sound system for viewing the rear seat of a vehicle which has many of the advantages of the mirror and sound system for a rear seat of a vehicle mentioned heretofore and many novel features that result in a new adjustable mirror and sound system for viewing the rear seat of a vehicle which is not anticipated, rendered obvious, suggested, or even implied by any of the prior art mirror and sound system for a rear seat of a vehicle, either alone or in any combination thereof.

To attain this, the present invention generally comprises a clamping assembly being adapted to securely clamp to a child's seat in a rear seat of a vehicle; and also includes a mirror and sound support assembly including an elongate support member having a first end and a second end which is securely attached to the clamping assembly; and further includes a mirror and sound assembly being adjustably mounted to the mirror and sound support assembly; and also includes a mirror and sound system control assembly for adjusting positioning, volume, and lighting of the mirror and sound assembly.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new adjustable mirror and sound system for viewing the rear seat of a vehicle which has many of the advantages of the mirror and sound system for a rear seat of a vehicle mentioned heretofore and many novel features that result in a new adjustable mirror and sound system for viewing the rear seat of a vehicle which is not anticipated, rendered obvious, suggested, or even implied by any of the prior art mirror and sound system for a rear seat of a vehicle, either alone or in any combination thereof.

It is another object of the present invention to provide a new adjustable mirror and sound system for viewing the rear seat of a vehicle which may be easily and efficiently manufactured and marketed.

It is a further object of the present invention to provide a new adjustable mirror and sound system for viewing the rear seat of a vehicle which is of a durable and reliable construction.

An even further object of the present invention is to provide a new adjustable mirror and sound system for viewing the rear seat of a vehicle which is susceptible of a low cost of manufacture with regard to both materials and labor, and which accordingly is then susceptible of low prices of sale to the consuming public, thereby making such adjustable mirror and sound system for viewing the rear seat of a vehicle economically available to the buying public.

Still yet another object of the present invention is to provide a new adjustable mirror and sound system for viewing the rear seat of a vehicle which provides in the apparatuses and methods of the prior art some of the advantages thereof, while simultaneously overcoming some of the disadvantages normally associated therewith.

Still another object of the present invention is to provide a new adjustable mirror and sound system for viewing the rear seat of a vehicle for allowing the driver of the vehicle to keep watch on a child seated in the rear seat behind the driver.

Yet another object of the present invention is to provide a new adjustable mirror and sound system for viewing the rear seat of a vehicle which includes a clamping assembly being adapted to securely clamp to a child's car seat inside of a passenger compartment of a vehicle; and also includes a mirror and sound support assembly including an elongate support member having a first end and a second end which is securely attached to the clamping assembly; and further includes a mirror and sound assembly being adjustably mounted to the mirror and sound support assembly; and also includes a mirror and sound system control assembly for adjusting positioning, volume, and lighting of the mirror and sound assembly.

Still yet another object of the present invention is to provide a new adjustable mirror and sound system for viewing the rear seat of a vehicle that not only allows the user to adjustably set the mirror to view the child in the rear seat but also allows the user to entertain the child with the sound-producing mechanism.

Even still another object of the present invention is to provide a new adjustable mirror and sound system for viewing the rear seat of a vehicle that can be easily and quickly attached and removed from inside the passenger compartment of the vehicle when not needed.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
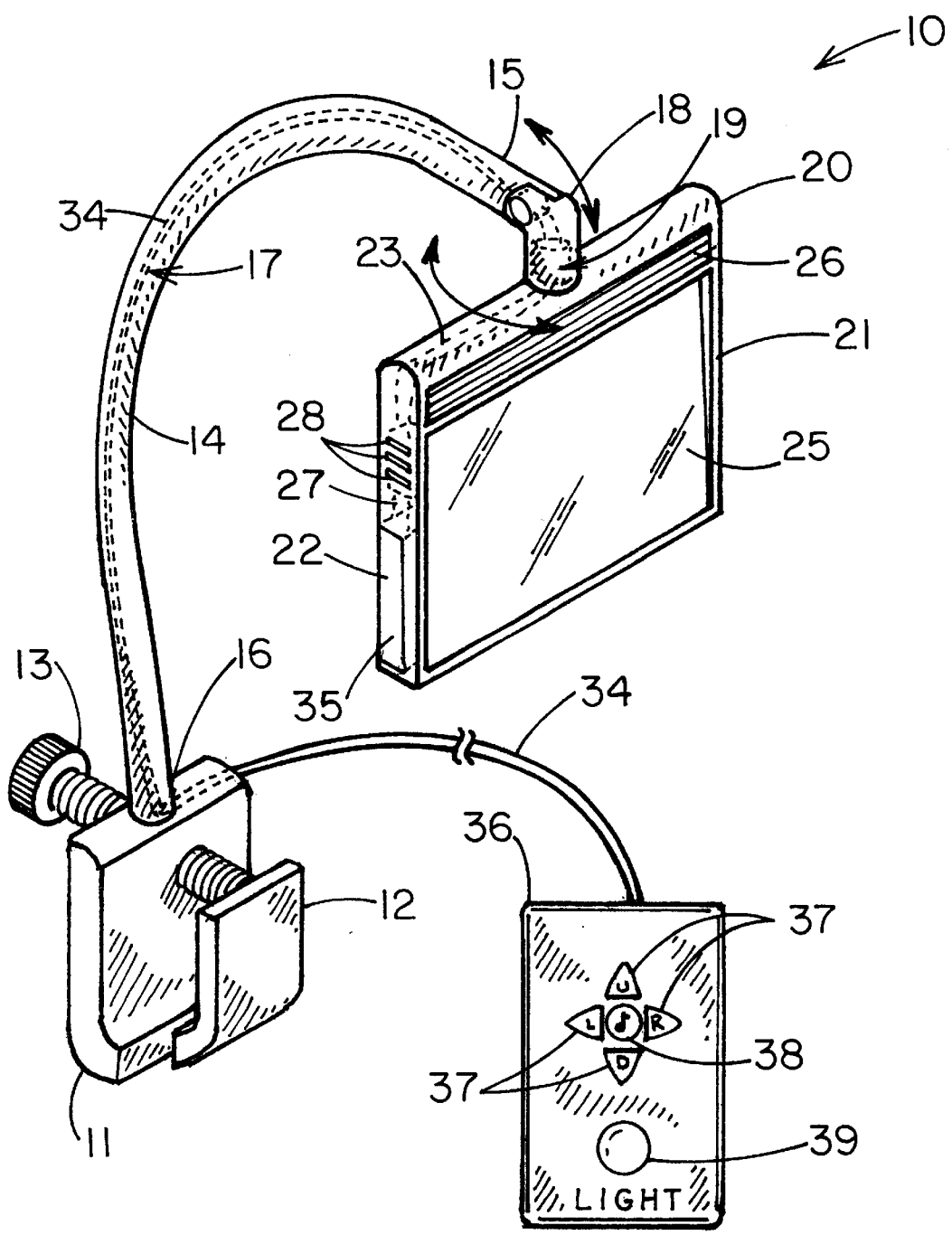
FIG. 1 is a perspective view of a new adjustable mirror and sound system for viewing the rear seat of a vehicle according to the present invention.
Figure 2:
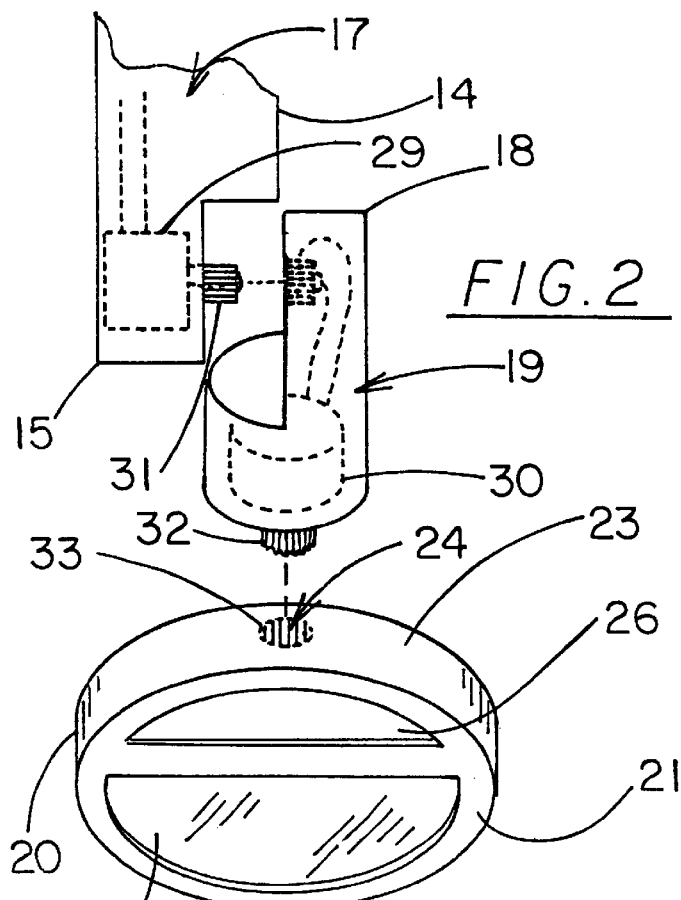
FIG. 2 is a detailed cross-sectional view of the first end of the elongate mirror support member of the present invention.
Figure 3:
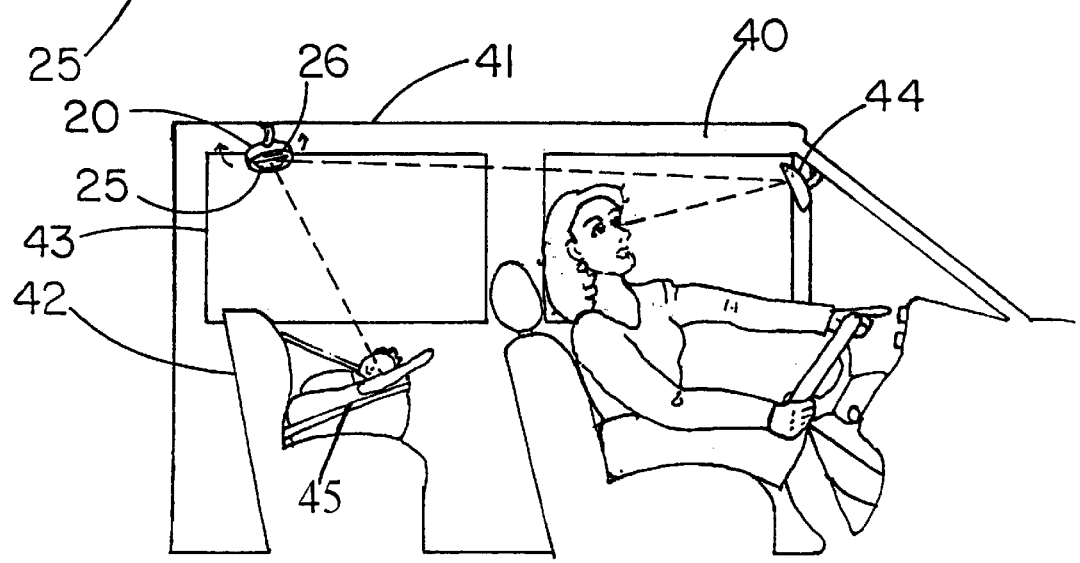
FIG. 3 is a side elevational view of the present invention shown in use.

With reference now to the drawings, and in particular to FIGS. 1 through 3 thereof, a new adjustable mirror and sound system for viewing the rear seat of a vehicle embodying the principles and concepts of the present invention and generally designated by the reference numeral 10 will be described.

As best illustrated in FIGS. 1 through 3, the adjustable mirror and sound system for viewing the rear seat of a vehicle 10 generally comprises a clamping assembly being adapted to securely clamp to a child's seat 45 or inside of a passenger compartment of a vehicle. The clamping assembly includes a first clamping member 11, an elongate fastening member 13 threaded through the first clamping member 11, and a second clamping member 12 being securely attached to an end of the elongate fastening member 13 with the first and second clamping members 11,12 being adapted to fastenably engage about a child's seat or inside a passenger compartment of the vehicle 40.

A mirror and sound support assembly 14–19 includes an elongate support member 14 having a first end 15 and a second end 16 which is securely and conventionally attached to the clamping assembly 11–13. The mirror and sound support assembly 14–19 further includes a coupler 18 being movably and conventionally attached to the first end 15 of the elongate support member 14 and being conventionally attached to the mirror and sound assembly 14–19. The elongate support member 14 is essentially a tubular member having a bore 17 extending therethrough, and the coupler 18 is essentially an elbow-like tubular fitting having a bore 19 therein.

A mirror and sound assembly 20–28 is adjustably mounted to the mirror and sound support assembly 14–19 with the mirror and sound assembly 20–28 including a housing 20 having a front 21, sides 22, and a top 23, and also including a mirror 25 adjustably and conventionally disposed in the front 21 of the housing 20, and further including a light-emitting member 26 securely and conventionally disposed in the front 21 of the housing 20 above the mirror 25, and also including a sound-producing mechanism 27 conventionally disposed in the housing 20 and having a speaker 28 securely and conventionally disposed in one of the sides 22 of the housing 20.

A mirror and sound system control assembly 29–39 for adjusting positioning, volume, and lighting of the mirror and sound assembly 20–28, the mirror and sound system control assembly 29–39 includes a first motor 29 having a rotatable shaft and being securely and conventionally disposed in the elongate support member 14 near the first end 15 thereof, and also includes a second motor 30 also having a rotatable shaft and being securely and conventionally disposed in the coupler 18, and further includes a first gear 31 securely mounted to the rotatable shaft of the first motor 29 and being engagable to the coupler 18 and being adapted to move the coupler 18 relative to the elongate support member 14, and also includes a second gear 32 securely mounted to the rotatable shaft of the second motor 30 and being engaged to the housing 20 for rotating the housing 20 relative to the coupler 18, and further includes a battery pack 35 being removably disposed in the housing 20 through one of the sides 22 thereof, and also includes a control unit 36 being connected to the battery pack 35, to the first and second motors 29,30, to the light-emitting member 26, and to the sound-producing mechanism 27 with wires 34 which are disposed through the elongate support member 14. The control unit 36 includes a plurality of switches 37–39 movably and conventionally disposed upon the control unit 36 with the switches 37–39 including directional switches 37 for moving the housing 20 vertically and horizontally and also including a volume switch 38 for controlling the volume of the sound-producing mechanism 27 and further including a light switch 39 for turning the light-emitting member 26 on and off. The housing 20 further includes a hole 24 in the top 23 thereof with the mirror and sound system control assembly 29–39 also including a ring gear 33 securely and conventionally disposed in the hole 24 of the housing 20 and being engagable with the second gear 32. The coupler 18 includes a corrugated interior surface extending a length of the coupler 18 and being gable with the first gear 31 for moving the coupler 18 and the housing vertically relative to the elongate support member 14.

In use, the user attaches the clamping assembly 11-13 to a child's car seat or inside of a passenger compartment such as a roof 41 of the vehicle 40 above the rear window 43 and extends the elongate support member 14 in the passenger compartment of the vehicle 40 and positions the mirror 25 so that the driver can look through one's rear view mirror 44 inside the passenger compartment of the vehicle 40 to not only see the mirror 25 but also to look through the mirror 25 to view the child in the rear seat 42 of the vehicle 40 with the clamping assembly varying according to mode of use. The user can move the mirror 25 up and down and left and right by using the switches 37–39 on the control unit 36 which may be hand-held on mounted directly into the dashboard of the vehicle 40. While driving in the dark, the drive can turn on the light-emitting member 26 to better see the child in the rear seat 42. The driver can also entertain the child by turning on the sound-producing mechanism 27.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. An adjustable mirror and sound system for a rear seat of a vehicle comprising:
   a clamping assembly being adapted to securely clamp to a child's car seat or inside of a passenger compartment of a vehicle;
   a mirror and sound support assembly including an elongate support member having a first end and a second end which is securely attached to said clamping assembly;
   a mirror and sound assembly being adjustably mounted to said mirror and sound support assembly; and
   a mirror and sound system control assembly for adjusting positioning, volume, and lighting of said mirror and sound assembly.

2. An adjustable mirror and sound system for a rear seat of a vehicle as described in claim 1, wherein said clamping assembly includes a first clamping member, an elongate fastening member threaded through said first clamping member, and a second clamping member being securely attached to an end of said elongate fastening member, said first and second clamping members being adapted to fastenably engage about an edge of a roof of the vehicle.

3. An adjustable mirror and sound system for a rear seat of a vehicle as described in claim 2, wherein said mirror and sound support assembly further includes a coupler being attached to said first end of said elongate support member and being attached to said mirror and sound assembly.

4. An adjustable mirror and sound system for a rear seat of a vehicle as described in claim 3, wherein said elongate support member is a generally tubular member having a bore extending therethrough, and said coupler is a generally elbow-like tubular fitting.

5. An adjustable mirror and sound system for a rear seat of a vehicle as described in claim 4, wherein said mirror and sound assembly includes a housing having a front, sides, and a top, and also includes a mirror adjustably disposed in said front of said housing, and further includes a light-emitting member securely disposed in said front of said housing above said mirror, and also includes a sound-producing mechanism disposed in said housing and having a speaker securely disposed in one of said sides of said housing.

6. An adjustable mirror and sound system for a rear seat of a vehicle as described in claim 5, wherein said mirror and sound system control assembly includes a first motor having a rotatable shaft and being securely disposed in said elongate support member near said first end thereof, and also includes a second motor also having a rotatable shaft and being securely disposed in said coupler, and further includes a first gear securely mounted to said rotatable shaft of said first motor and being engagable in said coupler and being adapted to move said coupler relative to said elongate support member, and also includes a second gear securely mounted to said rotatable shaft of said second motor and being engaged to said housing for rotating said housing relative to said coupler, and further includes a battery pack being removably disposed in said housing through one of said sides thereof, and also includes a control unit being connected to said battery pack, to said first and second motors, to said light-emitting member, and to said sound-producing mechanism with wires which are disposed through said elongate support member.

7. An adjustable mirror and sound system for a rear seat of a vehicle as described in claim 6, wherein said control unit includes a plurality of switches movably disposed upon said control unit, said switches including directional switches for moving said housing vertically and horizontally and also including a volume switch for controlling the volume of said sound-producing mechanism and further including a light switch for turning said light-emitting member on and off.

8. An adjustable mirror and sound system for a rear seat of a vehicle as described in claim 7, wherein said housing further includes a hole in said top thereof.

9. An adjustable mirror and sound system for a rear seat of a vehicle as described in claim 8, wherein said mirror and sound system control assembly also includes a ring gear securely disposed in said hole of said housing and being engagable with said second gear.

10. An adjustable mirror and sound system for a rear seat of a vehicle as described in claim 9, wherein said coupler includes a corrugated interior surface extending a length of said coupler and being engagable with said first gear for moving said coupler and said housing vertically.

11. An adjustable mirror and sound system for a rear seat of a vehicle comprising:

a clamping assembly being adapted to securely clamp to a child's car seat or inside of a passenger compartment of a vehicle, said clamping assembly including a first clamping member, an elongate fastening member threaded through said first clamping member, and a second clamping member being securely attached to an end of said elongate fastening member, said first and second clamping members being adapted to fastenably engage about an edge of a roof of the vehicle;

a mirror and sound support assembly including an elongate support member having a first end and a second end which is securely attached to said clamping assembly, said mirror and sound support assembly further including a coupler being attached to said first end of said elongate support member and being attached to said mirror and sound assembly, said elongate support member being essentially a tubular member having a bore extending therethrough, and said coupler being essentially an elbow-like tubular fitting having a bore therein;

a mirror and sound assembly being adjustably mounted to said mirror and sound support assembly, said mirror and sound assembly including a housing having a front, sides, and a top, and also including a mirror adjustably disposed in said front of said housing, and further including a light-emitting member securely disposed in said front of said housing above said mirror, and also including a sound-producing mechanism disposed in said housing and having a speaker securely disposed in one of said sides of said housing; and a mirror and sound system control assembly for adjusting positioning, volume, and lighting of said mirror and sound assembly, said mirror and sound system control assembly including a first motor having a rotatable shaft and being securely disposed in said elongate support member near said first end thereof, and also including a second motor also having a rotatable shaft and being securely disposed in said coupler, and further including a first gear securely mounted to said rotatable shaft of said first motor and being engagable in said coupler and being adapted to move said coupler relative to said elongate support member, and also including a second gear securely mounted to said rotatable shaft of said second motor and being engaged to said housing for rotating said housing relative to said coupler, and further including a battery pack being removably disposed in said housing through one of said sides thereof, and also including a control unit being connected to said battery pack, to said first and second motors, to said light-emitting member, and to said sound-producing mechanism with wires which are disposed through said elongate support member, said control unit including a plurality of switches movably disposed upon said control unit, said switches including directional switches for moving said housing vertically and horizontally and also including a volume switch for controlling the volume of said sound-producing mechanism and further including a light switch for turning said light-emitting member on and off, said housing further including a hole in said top thereof, said mirror and sound system control assembly also including a ring gear securely disposed in said hole of said housing and being engagable with said second gear, said coupler including a corrugated interior surface extending a length of said coupler and being engagable with said first gear for moving said coupler and said housing vertically.

\* \* \* \* \*